Sept. 22, 1931.　　　R. N. EARLY ET AL　　　1,824,595
ALTERNATING CURRENT MOTOR REGULATION
Filed Dec. 31, 1927
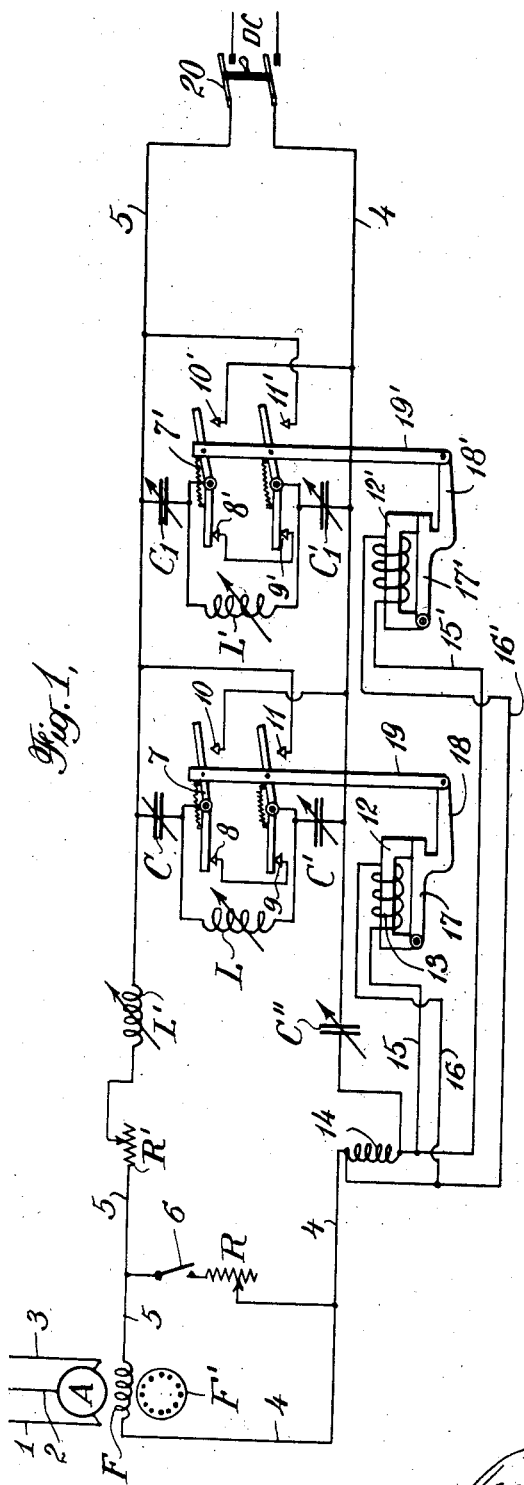
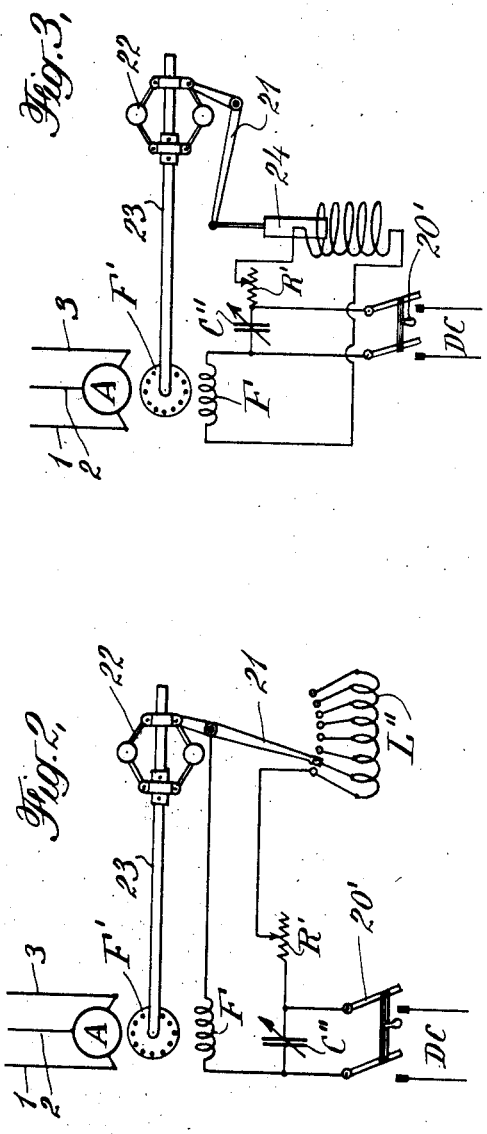
INVENTORS
R. N. Early
S. P. Bobeau
BY
　　ATTORNEY Patented Sept. 22, 1931

1,824,595

UNITED STATES PATENT OFFICE

RUPERT N. EARLY AND SANFORD P. BORDEAU, OF MINNEAPOLIS, MINNESOTA, ASSIGNORS TO ELECTRIC MACHINERY MANUFACTURING COMPANY, OF MINNEAPOLIS, MINNESOTA, A CORPORATION OF MINNESOTA

ALTERNATING CURRENT MOTOR REGULATION

Application filed December 31, 1927. Serial No. 243,909.

Our invention relates to improvements in dynamo-electric machines and more particularly to motors of the types adapted to be started by utilizing a current or currents flowing in one or more closed secondary circuits.

One of the objects of our invention is to provide a motor capable of developing high starting torque and this without drawing excessive current from the line. A further object of our invention is to provide means for controlling the phase relation between the current and voltage of one or more secondary circuits of a motor to the end that the starting torque may be improved at one or more stages during the starting period or thruout the entire starting period of the machine.

It is well known that the reactance of a secondary circuit of an induction motor, or of a secondary closed circuit on a synchronous motor arranged for starting as an induction motor, causes the current flowing in this circuit to lag behind the voltage generated in this circuit during the starting period. It is also recognized that in such a motor the torque produced during the starting period depends upon the magnitude of that component of the secondary current which is in phase with the generated secondary voltage. The reactance of the secondary circuit has the effect of decreasing this in-phase component of the secondary current.

According to our invention an electric motor of the types above mentioned is so operated and controlled that the secondary current is as nearly in phase with the secondary voltage as may be desired for any given set of circumstances. This can be accomplished by utilizing in cooperative relation with the secondary circuit some means for altering the phase relation of the secondary current with respect to the secondary voltage, as by introducing a leading current component neutralizing to the desired extent the lagging component which exists because of the reactance of the secondary circuit. For example, we have found that the desired result can be accomplished by utilizing in one or more secondary circuits a capacity reactance of a magnitude sufficient to neutralize to the desired extent the inductive reactance of this circuit, the maximum neutralization occurring at practically any desired moment during the starting period or substantially continuously thruout the starting period.

Inasmuch as the frequency of the secondary current of a motor of the types above mentioned decreases with increasing speed it necessarily follows that the inductive reactance of the secondary circuit decreases with increasing speed. Accordingly, if it is desired to maintain maximum neutralization or compensation thruout any considerable portion of the starting period it is necessary to either increase the inductance of the circuit by some external means or to increase the capacity of the secondary circuit, and both the inductance and capacity may be increased in order to maintain the inductive reactance equal to the capacity reactance.

A condition of resonance may be maintained thruout a considerable portion of the starting period by varying either the capacity or the inductance inversely as the square of the frequency of the secondary current.

Our invention contemplates the use of means such as a condenser in the secondary circuit for producing any desired predetermined phase relation between the secondary current and secondary voltage; for example, the current may be brought into phase with the secondary voltage or may be caused to lead the secondary voltage during the initial portion of the starting period. Our invention contemplates changing either the inductance or the capacity, or both, of the secondary circuit at intervals during the starting period and this may be done continuously instead of at intervals. Furthermore, the variation may be in proportion to the inverse square of the frequency. Means responsive to the speed of the motor or to the slip frequency of the secondary current may be employed for the purpose of changing the constants of the secondary circuit.

The various objects and advantages of our invention will be more apparent upon considering the following detailed description which is to be taken in conjunction with the accompanying drawings in which Fig. 1 represents in diagrammatic form one embodiment of our invention as applied to a polyphase synchronous motor. Fig. 2 illustrates another embodiment of our invention and Fig. 3 illustrates still another embodiment of our invention.

In Fig. 1 of the accompanying drawings we have illustrated the primary A of a polyphase synchronous motor adapted to be supplied with alternating current thru leads 1, 2 and 3 and having a squirrel cage or damper secondary winding F′ and a main field winding F. A variable resistance R is adapted to be connected across the terminals of the field winding F by means of leads 4 and 5 and a switch 6 is provided for opening the circuit thru this resistance whenever this is desired. We have illustrated a second variable resistance R′ connected in the field circuit in series with variable condensers C, C′ and C″, it being understood that according to one aspect of our invention these three condensers may be considered as a single condenser. A switch 7 having 2 sets of contact arms is adapted to connect the condensers C and C′ in series by cooperating with contacts 8 and 9, or in parallel by cooperating with contacts 10 and 11. With the condensers in parallel the capacity is of course equal to the sum of the capacities of the two condensers and thus by changing the connection from series to parallel the capacity of the circuit can be increased. The two sets of switch arms are spring-connected so that the set cooperating with contacts 10 and 11 may be closed before the other set breaks connection with the contacts 8 and 9. This makes it unnecessary to break the field circuit when altering the connections of the condensers C and C′. One or more of the condensers C, C′ and C″ may be independently variable and in general the arrangement is such that a wide range of capacity in the secondary or field circuit may be obtained.

Referring to the parts of the apparatus of Fig. 1 which have been thus far described it may be said that the capacity of the secondary or field circuit may be adjusted as by varying the individual condensers C, C′ and C″ or changing the series-parallel connections of the condensers C and C′, so as to cause the capacity reactance of the circuit to assume any desired value with respect to the inductance reactance and this at any desired moment during starting period; for example, the apparatus may be so adjusted as to produce a condition of resonance at the initial moment of the starting period, or the adjustment may be such that at this moment the secondary current leads the secondary voltage in which event the secondary current may come into phase with the secondary voltage at a later moment during the starting period. Furthermore, a condition of resonance or near resonance may be automatically secured at a plurality of moments during the starting period as by changing the connections of condensers C and C′ from series to parallel or in other words by moving the switch 7 to close the circuit at contacts 10 and 11 and break the circuit at contacts 8 and 9. This increase of the capacity of the circuit may compensate to some extent at least for the decrease in frequency of the secondary current.

Automatic operation of the switch 7 can be brought about by utilizing some means such as a frequency relay responsive to the frequency of the secondary current or in other words responsive to the slip of the machine. We have illustrated such a relay at 12, this relay having its coil 13 connected across a reactance 14 in the field circuit, this connection being established thru leads 15 and 16. The armature 17 of the relay is connected by suitable linkages 18 and 19 to the switch 7. The impedance of the coil 13 may be less than that of the reactance 14 so that during the initial portion of the starting period more current will flow thru coil 13 than will be the case during the later portion of the starting period. Accordingly the armature 17 is initially held up by the relay and when the slip frequency decreases to a predetermined value, the armature 17 will drop and operate the switch 7 to change the condenser connections from series to parallel. This increases the capacity of the circuit and tends to reestablish the initial condition of resonance or near resonance, assuming that such a condition obtained during the initial part of the starting period.

Not only may the capacity of the secondary circuit be increased, as pointed out above, but the inductance of the secondary circuit may also be increased and this automatically if desired as by connecting the inductance L across the terminals of the switch 7. When contacts 8 and 9 are closed this inductance is short-circuited but when these contacts are open and contacts 10 and 11 closed this inductance is connected in the field circuit in parallel with the condensers C and C′. The inductance L may be variable and a further change in the inductance of the secondary circuit may be effected by utilizing a second variable inductance L′.

In order that the constants of the secondary circuit may be changed at a plurality of intervals we may provide a second set of condensers C and C′ and if desired a second inductance element $L_1$ together with a switch 7′ operated by a frequency relay 12′, these parts being illustrated in the same manner as the corresponding parts above described. The coil of the relay 12′ is connected across the reactance 14 by means of leads 15′ and 16' and the relay armature is connected to the switch 7' by linkages 18' and 19'. The switch 7' has a pair of shortcircuited contacts 8' and 9' and a second pair of contacts 10' and 11' adapted to cooperate with the switch 7' so as to connect the condensers C_I and C_I' in parallel. The relay 12' may be adjusted to release its armature 17' at a lower frequency than that at which the relay 12 releases its armature with the result that condensers $C_I$ and $C_I'$ and the inductance element $L_I$ are all connected in parallel subsequent to the connection in parallel of condensers C and C' and the inductance L.

For synchronous operation the leads 4 and 5 may be arranged for connection to a source of direct current as by means of the switch 20.

In Fig. 2 we have illustrated means responsive to the speed of the motor for varying the number of effective turns of an inductance element with a view to maintaining a condition of approximate resonance thruout a substantial portion of the starting period. In this figure the motor armature is shown as A and is connected to the leads 1, 2 and 3. A squirrel cage or damper winding is shown at F' and the main field winding at F. A variable condenser C'' is connected in the field circuit as is also a variable resistance R' and the variable inductance L''. This inductance element is provided with a plurality of taps and a switch arm 21 cooperates therewith to alter the number of effective turns of the inductance element in the field circuit. This switch arm may be actuated by a speed responsive device, such as the fly-ball device shown at 22. This device may be mounted on the motor shaft illustrated diagrammatically at 23.

Referring to Fig. 2 it will be understood that as the motor speed increases during the starting period the frequency of the current in the winding F decreases and the initial condition of resonance or approximate resonance will not be maintained unless the constants of the field circuit are changed. The speed responsive device 22 changes the number of effective turns of the inductance element L'' in proportion to the speed and this serves to maintain the condition of approximate resonance because the inductance varies as the square of the number of effective turns of the inductance element. The device 22 is in a sense responsive to slip frequency, assuming constant frequency of the current supplied to the motor armature A.

For synchronous operation the motor of Fig. 2 has its field circuit adapted to be connected to a source of direct current as by means of the switch 20'.

The embodiment of the invention, illustrated in Fig. 3, is the same as that shown in Fig. 2 except for the manner in which the inductance of the field circuit is varied. Corresponding parts in the two figures bear the same reference characters. The inductance elements L''' of Fig. 3 is provided with a movable iron core 24 connected by the linkage 21 with the speed responsive device 22, the arrangement being such that as the speed increases the core is moved further into the coil of the inductance element, thus increasing the effective inductance of the field circuit. It will be understood that the capacity of the field circuit may be changed by speed responsive means and in fact both inductance and capacity may be so changed if it is desired.

Our invention contemplates the use of controlling means, such as means responsive to the frequency of the secondary current of the motor or means responsive to the speed of the motor for so changing the constants of one or more secondary circuits as to produce at intervals or maintain substantially continuously a condition of approximate resonance in said circuit to the end that the current flowing in this circuit may be utilized to the best advantage in producing torque during the starting period. When a condition of resonance obtains the magnitude of the secondary current may be controlled simply by adjusting the variable resistance in the secondary circuit. It is not necessary to rely upon the shortcircuited or squirrel cage winding F' to produce the required torque during the initial starting period and accordingly this winding may be designed for good pull-in torque. In this way high torque can be produced thruout the starting period and this without drawing excessive current from the line.

It will be understood that our invention is not limited to the particular embodiments illustrated and described but includes such modifications thereof as fall within the scope of the appended claims; for example, some of the elements shown in the several figures of the drawings may be modified or even eliminated without sacrificing all the advantages of the invention. The illustrations given are intended to serve merely as examples of some of the numerous ways in which the invention can be utilized.

We claim:—

1. The method of operating an alternating current motor, comprising, producing a revolving flux from the primary member, causing the revolving flux to generate a magnetization of slip frequency on the secondary member along an axis which is fixed with respect to the secondary member, and establishing a resonant or nearly resonant circuit comprising the fixed magnetization producing winding and tuned to a selected slip frequency.

2. The method of operating an alternating current motor, comprising, producing a revolving flux from the primary member, causing the revolving flux to generate a magnetization of slip frequency on the secondary member along an axis which is fixed with respect to the secondary member, establishing a resonant or near resonant circuit comprising the fixed magnetization producing winding and tuned to a selected slip frequency, and approximately maintaining the resonance over a range of speeds.

3. The method of operating an alternating current motor, comprising, producing a revolving flux from the primary member, causing the revolving flux to generate a magnetization on the secondary member along an axis which is fixed with respect to the secondary member, establishing resonance or near resonance in the fixed magnetization producing circuit at some period of the starting operation, and increasing the capacity of the fixed magnetization producing circuit as the motor speed increases beyond the value at which resonance occurs.

4. The method of operating an alternating current motor, comprising, producing a revolving flux from the primary member, causing the revolving flux to generate a magnetization of slip frequency on the secondary member along an axis which is fixed with respect to the secondary member, establishing resonance or near resonance in the fixed magnetization producing circuit tuned to a selected slip frequency, and decreasing the ohmic resistance of the fixed magnetization producing circuit as the motor speed increases.

5. The method of operating an alternating current motor, comprising, producing a revolving flux from the primary member, causing the revolving flux to generate a magnetization of slip frequency on the secondary member along an axis which is fixed with respect to the secondary member, establishing resonance or near resonance in the fixed magnetization producing circuit tuned to a selected slip frequency, and controlling the current in the fixed magnetization producing circuit over a range of speeds.

6. The method of operating an alternating current motor, comprising, producing a revolving flux from the primary member, causing the revolving flux to generate a substantially continuous torque at starting which diminishes with rising speed and becomes nil at synchronism, causing the revolving flux to generate a magnetization of slip frequency on the secondary member along an axis fixed with respect to the secondary member, and establishing resonance or near resonance in the fixed magnetization producing circuit tuned to a slip frequency obtaining at some period of the starting operation.

7. In a polyphase motor, a primary and a secondary member, a winding on the secondary in inductive relation to the primary and adapted to produce a magnetization of slip frequency along one axis per pole pair, and a static condenser in circuit with the winding on the secondary and having a capacity adjusted to cause the circuit of said winding to resonate at a selected slip frequency.

8. In a polyphase motor, a primary and a secondary member, a winding on the secondary in inductive relation to the primary and adapted to produce a magnetization along one axis per pole pair, and a resistance and a condenser in circuit with said winding on the secondary.

9. In a polyphase motor, a primary and a secondary, a winding on the secondary in inductive relation to the primary adapted to produce a magnetization along an axis which is fixed with respect to said secondary member, and means for causing the current in the winding on the secondary to lead the voltage generated in said winding by the revolving flux of the motor and when the motor speed is nil.

10. In a polyphase motor, a primary and a secondary, a winding on the secondary in inductive relation to the primary adapted to produce a magnetization of slip frequency along an axis which is fixed with respect to said secondary member, a closed circuit on the secondary in inductive relation to the winding on the secondary, and a static condenser in circuit with said winding, said condenser having a capacity adjusted to cause the circuit of said winding to resonate at a selected slip frequency.

11. The method of operating an alternating current motor, comprising, producing a revolving flux from the primary member, causing the revolving flux to generate a magnetization on the secondary member along an axis which is fixed with respect to the secondary member, establishing resonance or near resonance in the fixed magnetization producing circuit at some period of the starting operation, and varying the capacity of the fixed magnetization producing circuit over a range of speeds.

12. The method of operating an alternating current motor comprising, producing a revolving flux from the primary member, causing the revolving flux to generate a magnetization on the secondary member along an axis which is fixed with respect to the secondary member, establishing resonance or near resonance in the fixed magnetization producing circuit at some period of the starting operation, and varying the inductance of the fixed magnetization producing circuit over a range of speeds.

13. The method of operating an alternating current motor, comprising, producing a revolving flux from the primary member, causing the revolving flux to generate a magnetization on the secondary member along an axis which is fixed with respect to the secondary member, establishing resonance or near resonance in the fixed magnetization producing circuit at some period of the starting operation, and increasing the inductance of the fixed magnetization producing circuit as the motor speed increases beyond the value at which resonance occurs.

14. In a polyphase synchronous motor, a primary and a secondary member, a winding on the secondary in inductive relation to the primary and adapted to produce a magnetization along one axis per pole pair, means for supplying direct current to said secondary winding when the motor runs synchronously, a static condenser in circuit with said secondary winding, said condenser being inoperative when the motor runs synchronously.

In testimony whereof we affix our signatures.

RUPERT N. EARLY.
SANFORD P. BORDEAU.